(12) United States Patent
Hashimoto et al.

(10) Patent No.: US 12,173,203 B2
(45) Date of Patent: Dec. 24, 2024

(54) ADHESIVE RESIN COMPOSITION AND EASILY PEELABLE FILM

(71) Applicant: DOW-MITSUI POLYCHEMICALS CO., LTD., Tokyo (JP)

(72) Inventors: Hidenori Hashimoto, Chiba (JP); Takuya Ogata, Chiba (JP)

(73) Assignee: DOW-MITSUI POLYCHEMICALS CO., LTD., Tokyo (JP)

( * ) Notice: Subject to any disclaimer, the term of this patent is extended or adjusted under 35 U.S.C. 154(b) by 577 days.

(21) Appl. No.: 17/437,575

(22) PCT Filed: Mar. 11, 2020

(86) PCT No.: PCT/JP2020/010458
§ 371 (c)(1),
(2) Date: Sep. 9, 2021

(87) PCT Pub. No.: WO2020/195814
PCT Pub. Date: Oct. 1, 2020

(65) Prior Publication Data
US 2022/0135849 A1    May 5, 2022

(30) Foreign Application Priority Data
Mar. 28, 2019   (JP) .................. 2019-063037

(51) Int. Cl.
*C09J 7/35* (2018.01)
*C09J 7/40* (2018.01)
*C09J 11/06* (2006.01)
*C09J 11/08* (2006.01)

(52) U.S. Cl.
CPC ............... *C09J 7/35* (2018.01); *C09J 7/40* (2018.01); *C09J 11/06* (2013.01); *C09J 11/08* (2013.01); *C09J 2301/304* (2020.08); *C09J 2301/408* (2020.08); *C09J 2400/283* (2013.01); *C09J 2431/00* (2013.01)

(58) Field of Classification Search
CPC ....... C09J 7/35; C09J 7/40; C09J 11/06; C09J 11/08; C09J 2301/304; C09J 2301/408; C09J 2400/283; C09J 2431/00
See application file for complete search history.

(56) References Cited

FOREIGN PATENT DOCUMENTS

| JP | 2002-265704 A | 9/2002 |
|----|---------------|--------|
| JP | 2009-35645 A  | 2/2009 |
| JP | 2018-188609 A | 11/2018 |

(Continued)

OTHER PUBLICATIONS

International Search Report (ISR) dated Jun. 2, 2020 filed in PCT/JP2020/010458.

(Continued)

*Primary Examiner* — Ling Siu Cho
*Assistant Examiner* — Andrea Wu
(74) *Attorney, Agent, or Firm* — RANKIN, HILL & CLARK LLP

(57) ABSTRACT

An adhesive resin composition contains an ethylene-vinyl acetate copolymer (A) in which a content of a structural unit derived from vinyl acetate is 3% by mass or more and 18% by mass or less, and a melt mass flow rate (MFR, JIS K 7210:1999, 190° C., 2160 g load) is 5 g/10 min or more and 40 g/10 min or less, a tackifier resin (B), and an ethylene-vinyl acetate copolymer (C) having a viscosity of 15,000 mPa·s or more and 300,000 mPa·s or less measured at 18° C. using a Brookfield viscometer.

9 Claims, 1 Drawing Sheet

(56) References Cited

FOREIGN PATENT DOCUMENTS

| | | |
|---|---|---|
| TW | 201821567 A | 6/2018 |
| TW | 201842110 A | 12/2018 |
| TW | 201900822 A | 1/2019 |
| WO | 2013/042727 A1 | 3/2013 |

OTHER PUBLICATIONS

Japanese Office Action (JPOA) dated Sep. 26, 2023 for Japanese Patent Application No. 2022-176124.
Indian Office Action (INOA) dated Oct. 10, 2023 for Indian Patent Application No. 202117045623.
Taiwanese Office Action (TWOA) dated Mar. 27, 2024 for Taiwanese Patent Application No. 109109103.

ADHESIVE RESIN COMPOSITION AND EASILY PEELABLE FILM

TECHNICAL FIELD

The present invention relates to an adhesive resin composition and an easily peelable film.

BACKGROUND ART

Carrier tapes used for transporting or storing electronic components such as microchips are known as packaging materials. By using the carrier tape, electronic components and the like that are difficult to handle due to their too small size can be stored and transported by accommodating them one by one in the recessed portions provided on the carrier tape.

The carrier tape has recessed portions that can accommodate electronic components and the like, and is packaged by closing the recessed portions with a cover tape.

Further, plastic containers or paper containers including an easily peelable lid material are known as packaging materials for foods and drinks such as cup noodles, jellies, and yogurts, pharmaceuticals, and the like.

As the cover tape or lid material as described above, there is a demand for an easily peelable film that can be peeled off smoothly at the time of peeling while having appropriate adhesiveness.

As an easily peelable adhesive resin composition used for such an easily peelable film, for example, an adhesive resin composition containing an ethylene-vinyl acetate copolymer and a tackifier resin is known (see, for example, Patent Document 1).

Patent Document 1 discloses an easily peelable film obtained by laminating a base material film with an adhesive containing 100 parts by weight of an ethylene-vinyl acetate copolymer (A) having a vinyl acetate content of 3 to 18% by weight as measured by JIS K 6924-1 and a melt mass flow rate of 5 to 40 g/10 min as measured by JIS K 6924-1, 5 to 20 parts by weight of a tackifier resin (B), and 3 to 10 parts by weight of a low-molecular-weight ethylene-vinyl acetate copolymer (C) having a viscosity of 50 to 1,000 mPa·s as measured at 180° C. using a Brookfield viscometer.

RELATED DOCUMENT

Patent Document

[Patent Document 1] Japanese Unexamined Patent Publication No. 2009-35645

SUMMARY OF THE INVENTION

Technical Problem

As a packaging material, a paper carrier tape or a paper container using paper as a base material may be used. A cover tape for a paper carrier tape and a lid material for a paper container are required to have appropriate adhesiveness (that is, adhesiveness to such an extent that the cover tape and the lid material can be easily peeled off while having necessary adhesiveness to a paper base material) and not to cause paper peeling (that is, paper of the paper base material is not peeled off and fluffed) when being peeled off from the paper base material.

According to the studies of the present inventors, it has become clear that an easily peelable film using an adhesive resin composition containing an ethylene-vinyl acetate copolymer and a tackifier resin has room for improvement in the performance balance between low temperature heat sealability to paper base material, adhesiveness to paper base material, easy peelability from paper base material, and anti-blocking property.

The present invention has been made in view of the above circumstances, and provides an adhesive resin composition capable of realizing an easily peelable film excellent in performance balance between low temperature heat sealability to paper base material, adhesiveness to paper base material, easy peelability from paper base material, and anti-blocking property, and an easily peelable film using the same.

Solution to Problem

The present inventors have made extensive studies to achieve the above object. As a result, the present inventors have found that an easily peelable film excellent in balance between low temperature heat sealability, adhesiveness, easy peelability and anti-blocking property can be realized by using a combination of a specific ethylene-vinyl acetate copolymer, a tackifier resin and an ethylene-vinyl acetate copolymer having a specific viscosity, thereby completing the present invention.

According to the present invention, the following adhesive resin composition and easily peelable film are provided.

[1]
An adhesive resin composition containing:
an ethylene-vinyl acetate copolymer (A) in which a content of a structural unit derived from vinyl acetate is 3% by mass or more and 18% by mass or less, and a melt mass flow rate (MFR, JIS K 7210:1999, 190° C., 2160 g load) is 5 g/10 min or more and 40 g/10 min or less;
a tackifier resin (B); and
an ethylene-vinyl acetate copolymer (C) having a viscosity of 15,000 mPa·s or more and 300,000 mPa·s or less measured at 180° C. using a Brookfield viscometer.

[2]
The adhesive resin composition according to [1],
wherein when a content of the ethylene-vinyl acetate copolymer (A) is 100 parts by mass,
a content of the tackifier resin (B) is 1 part by mass or more and 30 parts by mass or less.

[3]
The adhesive resin composition according to [1] or [2],
wherein when a content of the ethylene-vinyl acetate copolymer (A) is 100 parts by mass,
a content of the ethylene-vinyl acetate copolymer (C) is 0.5 parts by mass or more and 20 parts by mass or less.

[4]
The adhesive resin composition according to any one of [1] to [3],
wherein a content of a structural unit derived from vinyl acetate of the ethylene-vinyl acetate copolymer (C) is in a range of 10% by mass or more and 35% by mass or less.

[5]
The adhesive resin composition according to any one of [1] to [4],
wherein a melt mass flow rate (MFR, JIS K 7210:1999, 190° C., 2160 g load) of the ethylene-vinyl acetate copolymer (C) is 50 g/10 min or more and less than 150 g/10 min.

[6]
The adhesive resin composition according to any one of [1] to [5], further comprising:
an antistatic agent (D).

[7]
The adhesive resin composition according to [6],
wherein when a content of the ethylene-vinyl acetate copolymer (A) is 100 parts by mass,
a content of the antistatic agent (D) is 0.1 parts by mass or more and 5 parts by mass or less.

[8]
An easily peelable film containing:
a base material layer; and
a heat sealable layer provided on one surface of the base material layer,
wherein the heat sealable layer includes the adhesive resin composition according to any one of [1] to [7].

[9]
The easily peelable film according to [8],
in which the easily peelable film is a cover tape for paper carrier tape.

Advantageous Effects of Invention

According to the present invention, it is possible to provide an adhesive resin composition capable of realizing an easily peelable film excellent in performance balance between low temperature heat sealability to paper base material, adhesiveness to paper base material, easy peelability from paper base material, and anti-blocking property, and an easily peelable film using the same.

BRIEF DESCRIPTION OF THE DRAWINGS

FIG. 1 is a cross-sectional view schematically showing an example of a structure of an easily peelable film to an embodiment of the present invention.

DESCRIPTION OF EMBODIMENTS

Hereinafter, embodiments of the present invention will be described with reference to the drawings. Unless otherwise specified, "X to Y" in the numerical range represents X or more and Y or less.

1. Regarding Adhesive Resin Composition

An adhesive resin composition of the present embodiment contains an ethylene-vinyl acetate copolymer (A) in which a content of a structural unit derived from vinyl acetate is 3% by mass or more and 18% by mass or less, and a melt mass flow rate (MFR, JIS K 7210:1999, 190° C., 2160 g load) is 5 g/10 min or more and 40 g/10 min or less, a tackifier resin (B), and an ethylene-vinyl acetate copolymer (C) having a viscosity of 15,000 mPa·s or more and 300,000 mPa·s or less measured at 180° C. using a Brookfield viscometer.

As described above, according to the studies of the present inventors, it has become clear that an easily peelable film using an adhesive resin composition containing an ethylene-vinyl acetate copolymer and a tackifier resin has room for improvement in performance balance between low temperature heat sealability to paper base material, adhesiveness to paper base material, easy peelability from paper base material, and anti-blocking property.

The present inventors have made extensive studies to achieve the above object. As a result, the present inventors have found that an easily peelable film excellent in balance between low temperature heat sealability, adhesiveness, easy peelability and anti-blocking property can be realized by using an adhesive resin composition containing an ethylene-vinyl acetate copolymer (A), a tackifier resin (B) and an ethylene-vinyl acetate copolymer (C).

That is, according to the adhesive resin composition of the present embodiment, by containing the above components, it is possible to realize an easily peelable film excellent in performance balance between low temperature heat sealability to paper base material, adhesiveness to paper base material (for example, having appropriate adhesive strength capable of protecting contents), easy peelability from paper base material (for example, suppressing fluffing of the paper base material at the time of peeling, stably peeling the paper base material without breaking the paper base material), and anti-blocking property.

Hereinafter, each component constituting the adhesive resin composition according to the present embodiment will be described.

<Ethylene-Vinyl Acetate Copolymer (A)>

An ethylene-vinyl acetate copolymer (A) according to the present embodiment has a content of a structural unit derived from vinyl acetate of 3% by mass or more and 18% by mass or less, from the viewpoint of improving low temperature heat sealability and anti-blocking property.

Further, the lower limit of the content of the structural unit derived from vinyl acetate is preferably 4% by mass or more, more preferably 5% by mass or more, and still more preferably 6% by mass or more, from the viewpoint of further improving the low temperature heat sealability.

The upper limit of the content of the structural unit derived from vinyl acetate is preferably 15% by mass or less, more preferably 12% by mass or less, and still more preferably 10% by mass or less, from the viewpoint of further improving anti-blocking property and antistatic properties.

The content of the structural unit derived from vinyl acetate can be determined in accordance with JIS K 7192:1999 by heating a polymer in an electric oven at 500° C. or higher to decompose the polymer, and subjecting the obtained acetic acid derived from vinyl acetate to neutralization titration.

Further, the ethylene-vinyl acetate copolymer (A) according to the present embodiment has a melt mass flow rate of 5 g/10 min or more and 40 g/10 min or less measured at a temperature of 190° C. and a load of 2160 g in accordance with JIS K 7210:1999 from the viewpoint of improving low temperature heat sealability and easy peelability.

Further, the lower limit of the melt mass flow rate is preferably 8 g/10 min or more, and more preferably 10 g/10 min or more, from the viewpoint of further improving the low temperature heat sealability, heat seal strength and easy peelability.

The upper limit of the melt mass flow rate is preferably 35 g/10 min or less, and more preferably 30 g/10 min or less, from the viewpoint of further improving processing stability and anti-blocking property.

A method for producing the ethylene-vinyl acetate copolymer (A) according to the present embodiment is not particularly limited, and the ethylene-vinyl acetate copolymer (A) can be produced by a known method. For example, the ethylene-vinyl acetate copolymer (A) can be obtained by radical copolymerization of each polymerization component under high temperature and high pressure. Further, the ethylene-vinyl acetate copolymer (A) used may be a commercially available product.

<Tackifier Resin (B)>

Since the tackifier resin has a function of imparting tackiness to the resin, it is possible to easily adjust the adhesive strength of the adhesive resin composition.

The tackifier resin is selected from resins having a function of imparting tackiness. Examples of the tackifier resin include aromatic hydrocarbon resins, alicyclic hydrocarbon resins, aliphatic hydrocarbon resins, terpene resins, rosins, styrene resins, and coumarone-indene resins.

Examples of the aromatic hydrocarbon resin include resins obtained by polymerizing a fraction containing at least one vinyl aromatic hydrocarbon having 8 to 10 carbon atoms such as vinyltoluene, indene, and α-methylstyrene, and resins obtained by copolymerizing these fractions with an aliphatic hydrocarbon fraction.

Examples of the alicyclic hydrocarbon resins include resins obtained by polymerization after cyclodimerization of diene components in spent C4 to C5 fractions, resins obtained by polymerization of cyclic monomers such as cyclopentadiene, and resins obtained by nuclear hydrogenation of aromatic hydrocarbon resins (for example, hydrogenated petroleum resins).

Examples of the aliphatic hydrocarbon resin include resins obtained by polymerizing a fraction containing at least one or more mono- or di-olefins having 4 to 5 carbon atoms such as 1-butene, isobutene, butadiene, 1,3-pentadiene, and isoprene.

Examples of the terpene resin include α-pinene polymer, β-pinene polymer, dipentene polymer, terpene-phenol copolymer, α-pinene-phenol copolymer, and hydrogenated products thereof.

Examples of rosins include rosins such as gum rosin, wood rosin, and tall oil, and modified products thereof, and examples of modified products include products subjected to modification such as hydrogenation, disproportionation, dimerization, and esterification.

Examples of the styrene resin include resin-like polymers having a low molecular weight obtained by polymerizing styrene monomers such as styrene, vinyltoluene, α-methylstyrene, and isopropyltoluene.

The tackifier resin is preferably a resin having a softening point of 85° C. to 130° C. Generally, when the softening point is 85° C. or higher, the effect of excellent heat resistance tends to be exhibited, and when the temperature is 130° C. or lower, the effect of imparting tackiness tends to be excellent.

The softening point of the tackifier resin may be a value measured based on the softening point testing method (ring ball method) in accordance with JIS K 2207:2006.

The content of the tackifier resin (B) is preferably 1 part by mass or more, more preferably 5 parts by mass or more, and still more preferably 10 parts by mass or more, based on 100 parts by mass of the content of the ethylene-vinyl acetate copolymer (A), from the viewpoint of further improving low temperature heat sealability and heat seal strength.

Further, the content of the tackifier resin is preferably 30 parts by mass or less, more preferably 25 parts by mass or less, and still more preferably 22 parts by mass or less, based on 100 parts by mass of the content of the ethylene-vinyl acetate copolymer (A), from the viewpoint of further improving easy peelability.

<Ethylene-Vinyl Acetate Copolymer (C)>

An ethylene-vinyl acetate copolymer (C) according to the present embodiment has a viscosity of 15,000 mPa·s or more and 300,000 mPa·s or less measured at 180° C. using a Brookfield viscometer, from the viewpoint of improving the stability of adhesive strength and easy peelability.

The lower limit of the viscosity is preferably 30,000 mPa·s or more, more preferably 50,000 mPa·s or more, still more preferably 87,000 mPa·s or more, further preferably 100,000 mPa·s or more, and particularly preferably 110,000 mPa·s or more, from the viewpoint of further improving stability of adhesive strength, easy peelability, anti-blocking property, and processability.

The upper limit of the viscosity is preferably 250,000 mPa·s or less, more preferably 220,000 mPa·s or less, and still more preferably 200,000 mPa·s or less, from the viewpoint of further improving stability of the adhesive strength and easy peelability.

The ethylene-vinyl acetate copolymer (C) according to the present embodiment preferably has a content of a structural unit derived from vinyl acetate of 10% by mass or more and 35% by mass or less, from the viewpoint of improving low temperature heat sealability and anti-blocking property.

Further, the lower limit of the content of the structural unit derived from vinyl acetate is preferably 12% by mass or more, and more preferably 15% by mass or more, from the viewpoint of further improving the low temperature heat sealability.

The upper limit of the content of the structural unit derived from vinyl acetate is preferably 35% by mass or less, more preferably 30% by mass or less, and still more preferably 25% by mass or less, from the viewpoint of further improving anti-blocking property and antistatic properties.

The content of the structural unit derived from vinyl acetate can be determined in accordance with JIS K 7192: 1999 by heating a polymer in an electric oven at 500° C. or higher to decompose the polymer, and subjecting the obtained acetic acid derived from vinyl acetate to neutralization titration.

Further, the ethylene-vinyl acetate copolymer (C) according to the present embodiment preferably has a melt mass flow rate as measured at a temperature of 190° C. and a load of 2160 g in accordance with JIS K 7210:1999 of 50 g/10 min or more and less than 170 g/10 min, and more preferably 50 g/10 min or more and less than 150 g/10 min, from the viewpoint of improving anti-blocking property.

Further, the lower limit of the melt mass flow rate is preferably 60 g/10 min or more, and more preferably 70 g/10 min or more, from the viewpoint of further improving the low temperature heat sealability, heat seal strength and easy peelability.

The upper limit of the melt mass flow rate is preferably 140 g/10 min or less, and more preferably 120 g/10 min or less, from the viewpoint of further improving processing stability and anti-blocking property.

The content of the ethylene-vinyl acetate copolymer (C) is preferably 0.5 parts by mass or more, more preferably 1.0 part by mass or more, and still more preferably 3.0 parts by mass or more, based on 100 parts by mass of the content of the ethylene-vinyl acetate copolymer (A), from the viewpoint of further improving stability of the adhesive strength and easy peelability.

Further, the content of the ethylene-vinyl acetate copolymer (C) is preferably 20 parts by mass or less, more preferably 15 parts by mass or less, and still more preferably 10 parts by mass or less, based on 100 parts by mass of the content of the ethylene-vinyl acetate copolymer (A), from the viewpoint of further improving stability of the adhesive strength and easy peelability.

A method for producing the ethylene-vinyl acetate copolymer (C) according to the present embodiment is not particularly limited, and the ethylene-vinyl acetate copolymer (C) can be produced by a known method. For example, the ethylene-vinyl acetate copolymer (A) can be obtained by radical copolymerization of each polymerization component under high temperature and high pressure. Further, the ethylene-vinyl acetate copolymer (C) used may be a commercially available product.

<Antistatic Agent (D)>

An adhesive resin composition according to the present embodiment preferably further contains an antistatic agent (D) from the viewpoint of improving the antistatic properties of the easily peelable film to be obtained. For example, it is possible to prevent charging when the cover tape is peeled off from the carrier tape. As a result, it is possible to suppress damage to the electronic component due to static electricity and adhesion of the electronic component to the cover tape.

The content of the antistatic agent (D) is preferably 0.1 parts by mass or more, more preferably 0.2 parts by mass or more, and still more preferably 0.3 parts by mass or more, based on 100 parts by mass of the content of the ethylene-vinyl acetate copolymer (A), from the viewpoint of further improving antistatic properties.

Further, the content of the antistatic agent (D) is preferably 5 parts by mass or less, more preferably 3 parts by mass or less, and still more preferably 1 part by mass or less, based on 100 parts by mass of the content of the ethylene-vinyl acetate copolymer (A), from the viewpoint of further improving adhesive strength.

Examples of the antistatic agent include a conductive polymer, a nonionic surfactant, and an anionic surfactant.

The conductive polymer is not particularly limited, and examples thereof include polythiophene, polyaniline, polypyrrole, polyethyleneimine, and allylamine-based polymers. Polythiophene is preferable from the viewpoint of low humidity dependence of antistatic performance. Here, polythiophene refers to a polymer of unsubstituted or substituted thiophene. In particular, the substituted thiophene polymer is preferably poly(3,4-ethylenedioxythiophene).

The nonionic surfactant is not particularly limited, and examples thereof include polyalkylene glycol-based nonionic surfactants such as a higher alcohol alkylene oxide type, an alkylphenol alkylene oxide type, an alkylamide type, an alkylamine type, and a polyalkylene glycol fatty acid ester type, and polyhydric alcohols and fatty acid ester-based nonionic surfactants thereof.

The anionic surfactant is not particularly limited, and examples thereof include an aliphatic or aliphatic group-substituted aromatic sulfonate, a higher alcohol sulfate ester salt, a higher alcohol ether (alkylene oxide adduct) sulfate ester salt, a higher alcohol phosphate ester salt, and a higher alcohol ether (ethylene oxide adduct) phosphate ester salt.

Such an antistatic agent can be used alone or in combination of two or more.

The antistatic agent used may be of a liquid type or may be dissolved in a suitable solvent and coated on the surface of the heat sealable layer described later.

<Other Components>

The adhesive resin composition according to the present embodiment may contain components other than the above as long as the effects of the present invention are not impaired. Other components are not particularly limited, and examples thereof include an anti-blocking agent, a slip agent, an antioxidant, a heat stabilizer, a light stabilizer, a pigment, and a dye. The other components may be used alone or in combination of two or more.

Examples of the anti-blocking agent include silica, aluminosilicate (zeolite, and the like).

Examples of the slip agent include various amides such as palmitamide, stearamide, behenamide, oleamide, erucamide, oleyl palmitamide, stearyl palmitamide, methylenebisstearamide, methylenebisoleamide, ethylenebisoleamid, ethylenebiserucamide; polyalkylene glycols such as polyethylene glycol and polypropylene glycol; and hydrogenated castor oil.

The adhesive resin composition according to the present embodiment is suitably used for adhering a paper base material. That is, the adhesive resin composition according to the present embodiment is suitably used for a cover tape for closing a housing portion for housing a microchip or the like of a paper carrier tape which is a paper container for transporting an electronic component.

Examples of the paper carrier tape include a paper carrier tape in which a bottom cover tape is heat-sealed to one surface (lower surface) of a storage mount having a plurality of punched holes formed at regular intervals in the longitudinal direction and the punched holes are used as recessed portions capable of storing electronic components; and a paper carrier tape in which a plurality of recessed portions capable of storing electronic components are formed at regular intervals in the longitudinal direction of the storage mount by embossing the storage mount.

By overlapping a cover tape on the carrier tape and adhering the cover tape by heat sealing or the like, it is possible to close the recessed portions accommodating a microchip such as an IC chip and store and transport the microchip.

Further, the adhesive resin composition according to the present embodiment is also suitably used as a lid material of a packaging paper container for foods and drinks such as cup noodles, jelly, and yogurt, as well as medicines.

In the adhesive resin composition according to the present embodiment, the total content of the ethylene-vinyl acetate copolymer (A), the tackifier resin (B), the ethylene-vinyl acetate copolymer (C), and the antistatic agent (D) is preferably 60% by mass or more, more preferably 70% by mass or more, even more preferably 80% by mass or more, and particularly preferably 90% by mass or more, based on 100% by mass of the entire adhesive resin composition. As a result, it is possible to further improve the performance balance between low temperature heat sealability to paper base material, adhesiveness to paper base material, easy peelability from paper base material, and anti-blocking property of the easily peelable film to be obtained.

<Method for Preparing Adhesive Resin Composition>

A method for preparing the adhesive resin composition is not particularly limited, and examples thereof include a method of preparing the adhesive resin composition by dry-blending and mixing the ethylene-vinyl acetate copolymer (A), the tackifier resin (B), the ethylene-vinyl acetate copolymer (C), and optionally the antistatic agent (D) with other components; and a method of preparing the adhesive resin composition by melt-kneading the ethylene-vinyl acetate copolymer (A), the tackifier resin (B), the ethylene-vinyl acetate copolymer (C), and optionally the antistatic agent (D) with other components in an extruder.

2. Easily Peelable Film

FIG. 1 is a cross-sectional view schematically showing an example of a structure of an easily peelable film 50 to an embodiment of the present invention.

The easily peelable film 50 according to the present embodiment is an easily peelable film containing a base material layer 10, and a heat sealable layer 20 provided on one surface of the base material layer 10, in which the heat sealable layer 20 includes the adhesive resin composition according to the present embodiment.

The easily peelable film of the present embodiment is preferably used as a cover tape for a paper carrier tape, which is a paper container for transporting electronic components.

<Base Material Layer>

The base material layer 10 is a layer provided for the purpose of improving the handleability, mechanical properties, heat resistance, and other properties of the easily peelable film 50.

Examples of the base material layer 10 include a plate-like material (sheet or film) made of paper, aluminum, polyester (for example, polyethylene terephthalate), polyethylene, polypropylene, polystyrene, polyamide, aluminum-deposited polyester, aluminum-deposited polypropylene, silica-deposited polyester, or the like. Among these, a sheet or film made of polyethylene terephthalate is preferable. The base material layer 10 may have not only a single layer structure but also a laminated structure of two or more layers.

The thickness of the base material layer 10 is, for example, 5 μm or more and 100 μm or less, and preferably 10 μm or more and 50 μm or less, from the viewpoint of mechanical strength and workability.

The surface of the base material layer 10 on the side to be adhered (or laminated) to the heat sealable layer 20 may be subjected to a physical treatment such as a corona treatment, a plasma treatment, a flame treatment, or an ozone treatment in order to increase the adhesive strength to the heat sealable layer 20. Further, the base material layer 10 may be subjected to a known anchor coating treatment.

<Heat Sealable Layer>

The heat sealable layer 20 is a layer for imparting heat sealability to the easily peelable film 50, and is made of the adhesive resin composition according to the present embodiment.

The thickness of the heat sealable layer 20 is, for example, 1 μm or more and 300 μm or less, preferably 5 μm or more and 200 μm or less, and more preferably 10 μm or more and 150 μm or less.

<Intermediate Layer>

The easily peelable film 50 according to the present embodiment may be provided with an intermediate layer such as polyethylene between the base material layer 10 and the heat sealable layer 20. The intermediate layer is a layer provided to enhance the adhesiveness between the base material layer 10 and the heat sealable layer 20 and to enhance the processability when forming the heat sealable layer 20.

3. Method for Producing Easily Peelable Film

A method for producing the easily peelable film 50 according to the present embodiment is not particularly limited, and a forming method commonly used for thermoplastic resins can be applied. For example, the production method can be carried out by a known method using a T-die extruder, a blown film machine or the like.

For example, the adhesive resin composition according to the present embodiment can be obtained by feeding the adhesive resin composition from a hopper of a T-die extruder and extruding the adhesive resin composition into a film from a tip of the T-die onto the base material layer 10.

Further, in the method for producing the easily peelable film 50 according to the present embodiment, a method commonly used for forming a multilayer film can be applied. For example, the production method can be carried out by a known method using a multilayer T-die extruder, a multilayer blown film machine or the like.

Although the embodiments of the present invention have been described above, these are examples of the present invention, and various configurations other than the above can be adopted.

EXAMPLES

Hereinafter, the present invention will be specifically described based on Examples, but the present invention is not limited to these Examples.

Details of the components used in the preparation of the adhesive resin composition are as follows.

<Ethylene-Vinyl Acetate Copolymer (A)>

EVA1: Ethylene-vinyl acetate copolymer (MFR=24 g/10 min, ethylene content=94% by mass, vinyl acetate content=6% by mass)

<Tackifier Resin (B)>

Tackifier resin 1: Hydrogenated product of alicyclic hydrocarbon resin (manufactured by Arakawa Chemical Industries, Ltd., Alcon P-115)

<Ethylene-Vinyl Acetate Copolymer (C)>

EVA2: Ethylene-vinyl acetate copolymer (MFR=100 g/10 min, ethylene content=81% by mass, vinyl acetate content=19% by mass, viscosity=140,000 mPa·s)

EVA3: Ethylene-vinyl acetate copolymer (MFR=400 g/10 min, ethylene content=81% by mass, vinyl acetate content=19% by mass, viscosity=28,000 mPa·s)

EVA4: Ethylene-vinyl acetate copolymer (MFR=150 g/10 min, ethylene content=75% by mass, vinyl acetate content=25% by mass, viscosity=85,000 mPa·s)

EVA5: Ethylene-vinyl acetate copolymer (MFR=15 g/10 min, ethylene content=81% by mass, vinyl acetate content=19% by mass, viscosity=900,000 mPa·s)

EVA6: Ethylene-vinyl acetate copolymer (MFR=800 g/10 min, ethylene content=81% by mass, vinyl acetate content=19% by mass, viscosity=12,000 mPa·s)

Here, the MFR (melt mass flow rate) was measured at a temperature of 190° C. and a load of 2160 g in accordance with JIS K7210: 1999.

Further, the viscosity of the ethylene-vinyl acetate copolymer (C) was measured at 180° C. using a Brookfield viscometer.

Apparatus name: BROOKFIELD DIGITAL VISCOMETER
Apparatus manufacturer: Brookfield Engineering Laboratories, Inc.
Model: RVTDV-II
Measurement temperature: 180° C.

<Antistatic Agent (D)>

Antistatic agent 1: Nonionic surfactant (product name: Electro Stripper TS7B, manufactured by Kao Corporation)

Examples 1 to 3, Comparative Examples 1 to 2

Preparation of Evaluation Sample (1) Preparation of Adhesive Resin Composition

Each component was melt-kneaded at 180° C. in an extruder (65 mmφ, L/D=28, front tip Dulmage flight screw) at the mixing ratio shown in Table 1 to obtain an adhesive resin composition. The obtained adhesive resin composition was cut into pellets and used for preparing a laminated film for evaluation.

(2) Preparation of Laminated Film for Evaluation

First, a biaxially stretched polyethylene terephthalate (PET) film (thickness 25 μm) was prepared. Using an extruder (65 mmφ, L/D=28), a screw (three stage type, groove depth ratio=4.78), and a die (900 mm width, inner Deckel-type), a 13 μm-thick low-density polyethylene polymer layer (density: 917 kg/m³, MFR (according to JIS K 7210:1999, temperature: 190° C., load: 2160 g): 7 g/10 min, melting point: 107° C.) was laminated on the PET-film via an anchor coating agent under the conditions of an air gap of 110 mm, a processing speed of 80 m/min, and a processing temperature of 320° C.

Next, a layer (thickness: 15 μm) made of the adhesive resin composition shown in Table 1 was laminated on the layer of the low-density polyethylene polymer using the extruder, screw and die under the conditions of an air gap of 110 mm, a processing speed of 80 m/min and a processing temperature of 220° C. to prepare a laminated film for evaluation (easily peelable film).

The following evaluations were performed on the obtained laminated film for evaluation. The results obtained are shown in Table 1.

<Evaluation>

(1) Peeling Strength

The laminated film for evaluation was cut out in the MD direction (resin flow direction at the time of producing laminated film for evaluation) with a width of 3 cm. A sample was prepared by overlapping one surface of a paper base material (paper carrier tape made in Korea) cut into a 3 cm width in the same manner as the laminated film for evaluation and the surface of the laminated film for evaluation on which the layer made of the adhesive resin composition (heat sealable layer) was laminated, and heat sealing the paper base material and the laminated film for evaluation under the following conditions using a heat sealer (heat seal tester TP-701-B manufactured by Tester Sangyo Co., Ltd.). The heat sealing was performed under the conditions of a heat sealing temperature of 160° C., a heat sealing time of 0.3 seconds, a heat sealing bar width of 1 mm, and a gauge pressure of 0.06 MPa.

After the heat sealing, the laminated film was peeled off from the paper base material using a peeling tester (VG-35, manufactured by Vanguard Systems INC.) under the conditions of a peeling angle of 180° and a peeling speed of 300 mm/min, and the peeling force was measured.

(2) Low Temperature Peeling

The laminated film was peeled off from the paper base material and the peeling force was measured in the same manner as in (1) peeling strength except that the heat sealing temperature was changed to 120° C.

(3) Evaluation of Peeling Status

The sample after the measurement of the peeling strength was observed with a microscope.

Criteria: A: No paper fiber adhesion, B: Paper fiber adhesion unnoticeable, C: Paper fiber adhesion noticeable (4) Evaluation of Antistatic Properties Using a resistivity meter (HIRESTA-UP, UR-100 probe manufactured by Mitsubishi Chemical Analytech Co., Ltd.) the surface resistivity of the easily peelable film was measured under the conditions of a measurement voltage of 500 V, a measurement time of 30 seconds, 23° C., and 50% RH to evaluate the antistatic properties.

(5) Blocking Evaluation

Two laminated films for evaluation were prepared in a strip shape having a 25 mm width, and the surface on the heat sealable layer side and the surface on the biaxially stretched polyester film side were overlapped with each other, and left in an oven at 40° C. for 24 hours while applying a load of 320 g/cm².

Next, the two laminated films for evaluation were peeled off using a peeling tester (VG-35, manufactured by Vanguard Systems INC.) under the conditions of a peeling angle of 180° and a peeling speed of 300 mm/min, and the peeling force was measured.

TABLE 1

| Type of components | Type of polymer | | Example 1 | Example 2 | Example 3 | Comparative Example 1 | Comparative Example 2 |
|---|---|---|---|---|---|---|---|
| Ethylene-vinyl acetate copolymer (A) | EVA1 | Parts by mass | 100 | 100 | 100 | 100 | 100 |
| Tackifier resin (B) | Tackifier resin 1 | Parts by mass | 19 | 19 | 19 | 19 | 19 |
| Ethylene-vinyl acetate copolymer (C) | EVA2 | Parts by mass | 6 | | | | |
| | EVA3 | Parts by mass | | 6 | | | |
| | EVA4 | Parts by mass | | | 6 | | |
| | EVA5 | Parts by mass | | | | 6 | |
| | EVA6 | Parts by mass | | | | | 6 |
| Antistatic agent (D) | Antistatic agent 1 | Parts by mass | 0.6 | 0.6 | 0.6 | 0.6 | 0.6 |
| Evaluation results | | | | | | | |
| Peeling strength | | g/mm | 51 | 59 | 53 | 57 | 57 |
| Low temperature peeling | | g/mm | 13 | 17 | 10 | 11 | 12 |
| Peeling status | | Observation | A | A | A | C | C |
| Blocking | | g/25 mm | 1 | 6 | 6 | 4 | 9 |
| Surface resistivity | | Ω/□ | $1.0 \times 10^{11}$ | $1.0 \times 10^{11}$ | $1.0 \times 10^{11}$ | $1.0 \times 10^{11}$ | $1.0 \times 10^{11}$ |

As is clear from Table 1, the easily peelable films using the adhesive resin compositions of Examples 1 to 3 were excellent in performance balance between low temperature heat sealability, adhesiveness, easy peelability and anti-blocking property. On the other hand, the easily peelable films using the adhesive resin compositions of Comparative Examples 1 and 2 were inferior in performance balance between low temperature heat sealability, adhesiveness, easy peelability and anti-blocking property.

From the above, it was confirmed that according to the adhesive resin composition according to the present embodiment, it is possible to realize an easily peelable film excellent in performance balance between low temperature heat sealability to paper base material, adhesiveness to paper base material, easy peelability from paper base material, and anti-blocking property.

This application claims priority on the basis of Japanese Patent Application No. 2019-063037 filed on Mar. 28, 2019, the entire disclosure of which is incorporated herein by reference.

REFERENCE SIGNS LIST

10: base material layer
20: heat sealable layer
50: easily peelable film

The invention claimed is:

1. An adhesive resin composition comprising:
an ethylene-vinyl acetate copolymer (A) in which a content of a structural unit derived from vinyl acetate is 3% by mass or more and 18% by mass or less, and a melt mass flow rate (MFR, JIS K 7210:1999, 190° C., 2160 g load) is 5 g/10 min or more and 40 g/10 min or less;
a tackifier resin (B); and
an ethylene-vinyl acetate copolymer (C) having a viscosity of 110,000 mPa·s or more and 250,000 mPa·s or less measured at 180° C. using a Brookfield viscometer.

2. The adhesive resin composition according to claim 1, wherein when a content of the ethylene-vinyl acetate copolymer (A) is 100 parts by mass,
a content of the tackifier resin (B) is 1 part by mass or more and 30 parts by mass or less.

3. The adhesive resin composition according to claim 1, wherein when a content of the ethylene-vinyl acetate copolymer (A) is 100 parts by mass,
a content of the ethylene-vinyl acetate copolymer (C) is 0.5 parts by mass or more and 20 parts by mass or less.

4. The adhesive resin composition according to claim 1, wherein a content of a structural unit derived from vinyl acetate of the ethylene-vinyl acetate copolymer (C) is in a range of 10% by mass or more and 35% by mass or less.

5. The adhesive resin composition according to claim 1, wherein a melt mass flow rate (MFR, JIS K 7210:1999, 190° C., 2160 g load) of the ethylene-vinyl acetate copolymer (C) is 50 g/10 min or more and less than 150 g/10 min.

6. The adhesive resin composition according to claim 1, further comprising:
an antistatic agent (D).

7. The adhesive resin composition according to claim 6, wherein when a content of the ethylene-vinyl acetate copolymer (A) is 100 parts by mass,
a content of the antistatic agent (D) is 0.1 parts by mass or more and 5 parts by mass or less.

8. An easily peelable film comprising:
a base material layer; and
a heat sealable layer provided on one surface of the base material layer,
wherein the heat sealable layer includes the adhesive resin composition according to claim 1.

9. The easily peelable film according to claim 8, wherein the easily peelable film is a cover tape for paper carrier tape.

* * * * *